United States Patent [19]

Cornet

[11] 4,398,203

[45] Aug. 9, 1983

[54] THERMO-OPTICAL METHOD FOR WRITING INFORMATION AND AN INFORMATION MEDIUM FOR THE APPLICATION OF SAID METHOD

[75] Inventor: Jean Cornet, Paris, France

[73] Assignee: Thomson-CSF, Paris, France

[21] Appl. No.: 291,076

[22] Filed: Aug. 7, 1981

[30] Foreign Application Priority Data

Aug. 13, 1980 [FR] France ................................ 80 17845

[51] Int. Cl.³ ........................ G01D 15/34; G11B 7/26
[52] U.S. Cl. .................................. 346/135.1; 369/100
[58] Field of Search ...................... 346/1.1, 76 L, 108, 346/135.1; 369/100

[56] References Cited

U.S. PATENT DOCUMENTS

| | | | |
|---|---|---|---|
| 3,665,483 | 5/1972 | Becker et al. | 346/1.1 |
| 4,285,056 | 8/1981 | Bell | 369/100 |
| 4,300,227 | 11/1981 | Bell | 369/100 X |
| 4,329,697 | 5/1982 | Bell | 346/135.1 |

OTHER PUBLICATIONS

I.B.M. Technical Disclosure, vol. 16, No. 2, Jul. 1973, pp. 498 & 499.

*Primary Examiner*—Donald A. Griffin
*Attorney, Agent, or Firm*—Cushman, Darby & Cushman

[57] ABSTRACT

Thermo-optical writing of information used for such applications as archival storage is performed on a medium in which a ductile metal film layer is stretched beyond the elastic limit under the pressure exerted by a contiguous layer of thermally deforming organic substance and is partially permeable to radiation produced by a light beam. An optical cavity formed between the ductile layer and a reflecting metal film layer is tuned so that the reflection factor of the information medium at the light-radiation wavelength increases with the deformation induced by the light beam.

19 Claims, 12 Drawing Figures

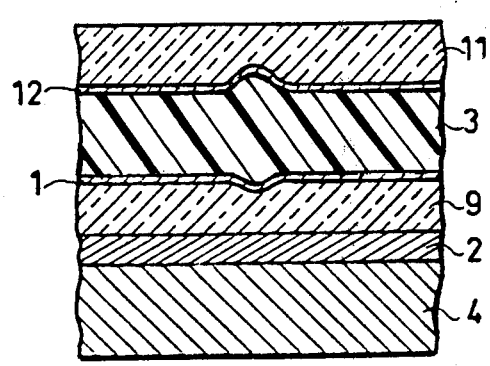
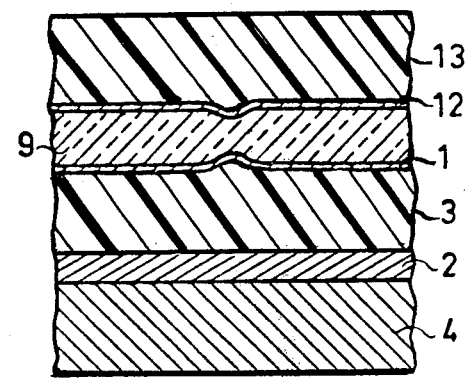
FIG.9  FIG.10
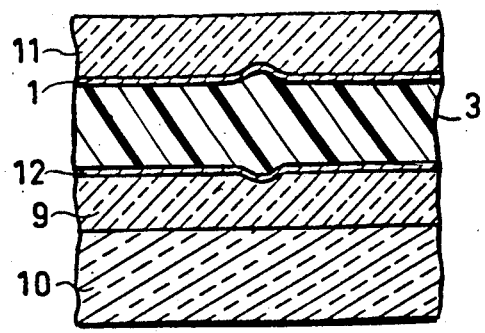
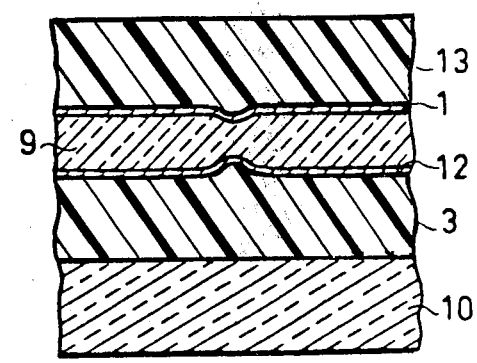
FIG.11  FIG.12

THERMO-OPTICAL METHOD FOR WRITING INFORMATION AND AN INFORMATION MEDIUM FOR THE APPLICATION OF SAID METHOD

This invention relates to recording of information along a track carried by a recording medium. More specifically, the invention is directed to a thermo-optical method which consists in focusing on the medium a beam of light radiation which has been modulated by the information. The energy contained in said radiation is converted to heat. The transient temperature rise produces along the track a continuous modification of the characteristics of the medium which can be read optically without any need to subject the medium to a chemical treatment for developing a latent image. The physical modification of the medium thus obtained may consist of a concave or convex impression. The impression left on the medium after passing of the writing beam depends on the incident power, on the rate of scanning of the medium and on the absorption capacity of the surface which receives the radiation. As a practical consequence, dimensional control of the impression is a difficult operation which requires an appreciable number of precautions.

In the case of thermo-optical writing by removal of material, it is possible to employ an absorbent film layer which covers a totally reflecting film layer. The thickness of the absorbent film is chosen so as to minimize reflection of the incident radiation. This has the advantage of improving the reading contrast between the zones which have been subjected to thermal ablation and those which have remained intact; in addition, ablation requires lower power since there is less reflection.

Thermo-optical writing by ablation of an absorbent film layer results in the formation of a crater surrounded by a fillet. An impression configuration of this type calls for accurate regulation of the writing energy in order to maintain a satisfactory signal-to-noise ratio while reading of the impression is in progress. Since the formation of the impression arises from a phenomenon of degradation occurring subsequently in time with respect to the storage of heat which oversteps the etching threshold, it is necessary to supervise the operation which consists in etching by ablation and to ensure that the power of the writing beam is adapted to the desired effect.

There also exists another thermo-optical writing technique which consists in producing plastic deformation in a ductile metal film layer by modifying a mechanical tension induced locally by a temperature rise within an organic sublayer which exhibits thermodeforming properties. Permanent elongation of the ductile film remains after the writing beam has passed. The impression obtained by means of this technique appears in the form of a fold of the metal film which is more or less marked but which is not pierced and does not form a fillet. The uniformity of an impression of this type is conducive to a good signal-to-noise ratio at the time of reading.

Nevertheless, if the power of the writing beam becomes excessive or if the reflectivity of the medium lacks uniformity, the ultimate stress may be exceeded and this would result in crack formation or destruction of the ductile metal film.

Storage of information by plastic deformation of a ductile film subjected to stretching is a distinctly more progressive process than ablation since deformation develops progressively as heat is applied by optical irradiation of the information medium. This progressivity can be profitably employed in order to improve the range of exposure of a ductile-film information medium. In fact, instead of regulating the power of the writing beam, steps can be taken to ensure that the thermo-optical conversion efficiency steadily decreases when the structure of the information medium is subjected to induced deformation. The information medium to which the self-regulating effect can be applied at the time of writing as has just been mentioned has a structure which is related to that of plates having semi-silvered parallel faces, the study of which leads to the construction of interferential filters.

In more exact terms, the invention is directed to a thermo-optical method for writing information on a medium comprising a ductile metal film layer associated with a contiguous film layer of thermodeforming organic substance. The writing operation utilizes a beam of light radiation having a predetermined wavelength and a point of convergence which is located at the level of said ductile metal film layer. Since said ductile metal layer is partially permeable to said radiation, the invention essentially consists in providing the information medium with a reflecting metal film layer which forms with the ductile metal layer an optical cavity having parallel faces and in tuning said optical cavity in such a manner as to ensure that the reflection of said light radiation from said ductile metal layer increases with the local deformation induced within said cavity under the thermodeforming action of that zone of said layer of organic substance which is exposed to said radiation.

The invention is also directed to an information medium which can be written by means of light radiation of predetermined wavelength and which comprises a ductile metal film layer associated with a contiguous layer of thermodeforming organic substance, said medium being distinguished by the fact that said ductile metal film layer is partially permeable to said radiation. A reflecting metal film layer forms with the ductile metal layer an optical cavity having parallel faces and tuned so that the reflection factor of said medium at said wavelength increases with the deformation induced by said beam of light radiation.

Other features of the invention will be more apparent upon consideration of the following description and accompanying drawings, wherein:

FIG. 9 is a sectional view of a sixth alternative embodiment of the information medium in accordance with the invention;

FIG. 10 is a sectional view of a seventh alternative embodiment of the information medium in accordance with the invention;

FIG. 11 is a sectional view of an eighth alternative embodiment of the information medium in accordance with the invention;

FIG. 12 is a sectional view of a ninth alternative embodiment of the information medium in accordance with the invention.

As mentioned in the foregoing, the invention is particularly directed to a method of writing which makes use of low-power lasers and does not require any external regulation of the optical writing-beam power inasmuch as the absorbed power is regulated automatically and in real time.

The thermo-optical method of regulating information usually has recourse to lasers having power outputs of less than 30 mW and is based in most cases on the principle of either thermal ablation or thermal deformation of a thin radiation-absorbing film deposited on a substrate. The width and/or amplitude of the impression are highly dependent on the light power and on the time-duration of the light pulse. Furthermore, in the fairly general case of writing through the substrate, the laser beam may encounter a certain number of "defects" during its travel down to the sensitive layer, e.g. dust particles, fingermarks, scratches on the recording medium and variations in thickness of this latter. These defects modify the instantaneous power available for writing. This may result in under-etching or over-etching which would be liable to impair the restitution of a high-quality signal. Finally, if the information medium is designed in the form of a rotating disk having a constant angular velocity, the information items are stored along the turns of a spiral or in a set of concentric circles and the power required for etching depends on the surface area to be etched, that is to say also on the radius of the circle or of the etching spiral. All these factors considered together entail the need for power regulation, for example by comparing at each instant the amplitude of the signal obtained at the time of reading with the amplitude of a reference signal, thus making it possible to use action on the intensity of the beam which falls on the sensitive film layer. However, this type of regulation cannot take place in real time or, in other words, is not adapted to the presence of local random defects such as scratches, dust particles or finger marks.

In the French patent Applications filed on Jan. 23rd, 1980 under No. 80 01 423 and No. 80 01 425, the thermo-optical recording techniques therein described made use of a ductile metal layer which transfers its heat to a sub-layer of organic substance having thermodeforming properties. Depending on requirements, the organic substance can be made of heat-expandable material or thermodegradable material which is capable of deforming the ductile metal film. During the writing operation, the ductile metal film is stretched beyond the elastic limit and to a point short of elongation at fracture. In other words, the film is deformed without resulting in formation of holes. Metal films which exhibit these characteristics are constituted by alloys between a precious metal such as gold and an adjuvant such as Cu, Mn, Cr, Al and so on which endow the alloy with excellent continuity, ductility and impact strength.

Figure 1:
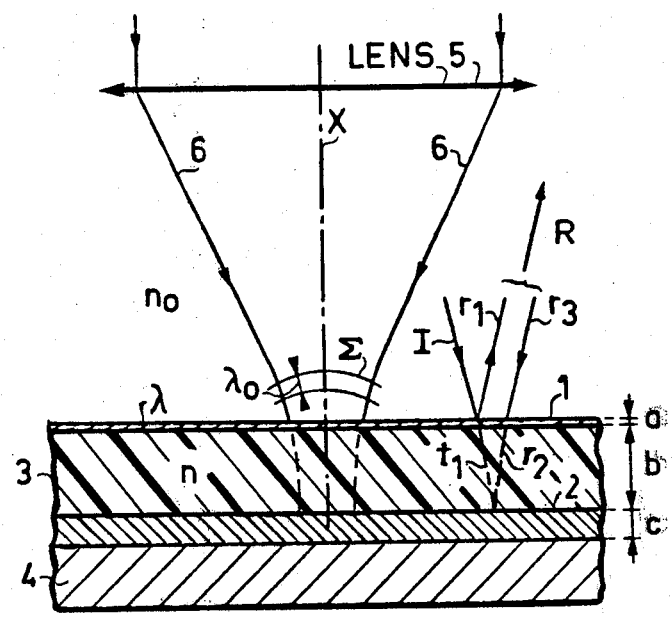
FIG. 1 is a sectional view of a first alternative embodiment of the information medium in accordance with the invention.

In FIG. 1 of the accompanying drawings, there is shown a cross-section of an information recording medium in accordance with the invention. This medium comprises a substrate 4 covered with a reflecting film layer 2 having a thickness c. There is deposited on said film layer 2 a thermodeforming layer 3 having a thickness b which is composed of a polymeric material having a refractive index n. Above the layer 3 is placed a ductile metal film 1 having a thickness a which does not exceed about twenty nanometers. The writing radiation beam 6 is focused on the film 1 by means of a projection objective 5, the optical axis X of which is oriented along the normal. The equiphase wavefronts $\Sigma$ are spaced at a distance $\lambda_o$ within the ambient medium having a refractive index $n_o$. The wavelength of the writing beam is therefore $\lambda_o$ and is reduced to $\lambda$ within the layer 3.

In contrast to the layer 2 which is of sufficient thickness to prevent transmission of radiation and consequently reflects the incident radiation without any appreciable absorption, the film 1 is partially reflecting, partially absorbing and partially permeable to the writing radiation beam 6. The thickness a of the ductile metal film 1 is therefore chosen so as to perform this threefold function of absorbing, reflecting and transmitting the writing beam 6.

Taking into account the index of extinction $\chi$ of metals, it is apparent that the thickness a is only a very small fraction of the wavelength $\lambda$. By way of indication, in the case of green light ($\lambda=0.5$ micron), a thick gold layer having one wavelength would attenuate $10^{10.5}$ times the intensity of this light.

In FIG. 1, the only element which is capable of converting the writing radiation 6 to heat is the film 1. The local temperature rise will be imparted to the sub-layer 3, thus exerting a thrust on the film 1. Said thrust is intended to stretch the film 1 locally beyond the limit of elasticity. As a result of the plastic deformation thus produced, a fold is left after the writing beam has passed and this fold constitutes the permanent impression of the information.

Figure 3:
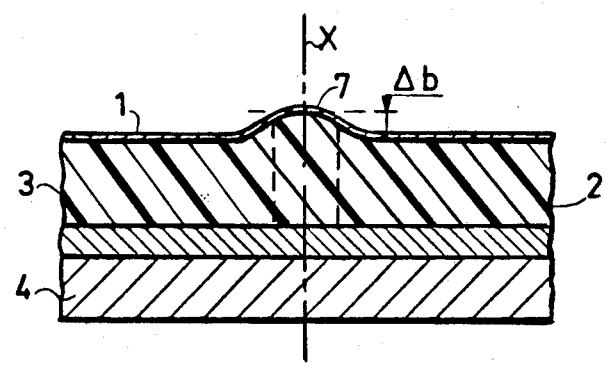

FIG. 3 shows a permanent impression 7 obtained by employing a heat-expandable polymer as a sub-layer 3. Said polymer contains a plasticizer which endows the layer 3 with high thermal expansivity and capability of filling the fold of the layer 1. The height $\Delta b$ of the fold 7 may attain a fraction of a micron.

Figure 4:
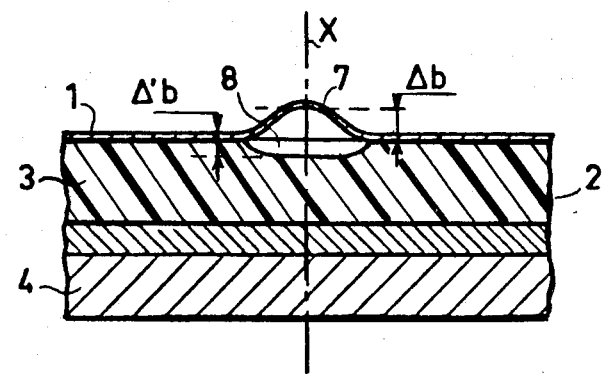

FIG. 4 shows a permanent impression 7 formed by thermodegradation of the layer 3. A cavity having a depth $\Delta'_b$ is formed in this case beneath the fold 7 of the film layer 1. The space 8 between said cavity and the fold 7 contains the gaseous residues which have formed as a result of thermodegradation of the layer 3.

In FIGS. 1, 3 and 4, the layers are drawn to a considerably larger scale than the substrate 4 in order to highlight the structural changes occurring within the zone which is centered around the optical axis X of the writing beam of radiation. In accordance with the invention, it can be observed that the optical cavity defined by the layers 1 and 2 is detuned when the information impression is formed. This detuning is turned to profitable account in order to obtain a self-regulating effect.

Since the layer 1 partially transmits the writing radiation, its reflecting properties are highly dependent on the composition of the subjacent layers and in particular on the interference regime existing within an optical cavity in which the optical length has the value nb. In FIG. 1, which illustrates the unrecorded information medium, there is shown on the right-hand side of the beam 6 the process of multiple reflection of an incident ray I. The ray I is partially reflected from the film 1 and gives rise to a reflected component $r_1$. The transmitted fraction $t_1$ of the ray I is reflected from the layer 2 in the form of a component $r_2$ which produces a second reflected component $r_3$ after passing through the film layer 1. The component $r_1$ and the components $r_3$ and those that follow from an algebraic sum R which is the resultant reflected radiation from the entire structure. The ratio R/I gives the reflection factor of the information medium.

By way of example and without any limitation being implied, the recording medium is fabricated from a substrate 4 covered with a film layer 2 which is highly reflecting in respect of the wavelength λ of the light employed for the etching operation, from a film layer 3 of dielectric material which is transparent to the wavelength λ and from a ductile metal film layer 1 which absorbs the radiation and covers the transparent layer 3. In order to ensure maximum coupling of energy within the absorbent material 1, it is necessary on the one hand to provide a reflecting layer 2 of sufficient thickness to ensure zero energy loss by transmission and on the other hand to provide an intermediate dielectric layer having a thickness b in the vicinity of $(2k+1)\lambda/4n$, that is, an odd multiple of one quarter-wavelength of light within the transparent material having a refractive index n in order to ensure that the overall light reflected by the structure as a result of destructive interferences is of a low order and typically within the range of 10 to 20%. In consequence, the greater part of the light energy transferred by the writing beam is concentrated within the radiation-absorbent metal film layer. In other words, the sensitivity is improved in comparison with the situation in which the substrate does not have a reflecting surface as described in French patent Applications No. 80 01 423 and No. 80 01 425 cited earlier.

According to one aspect of the present invention, the heat-expandable or thermodegradable material is chosen so as to ensure that the modification of its thickness b during the process of deformation of the ductile metal film 1 under the impact of the laser beam 6 is in the vicinity of one quarter-wavelength of light within said transparent material. The result thereby achieved is that the conditions of virtual antireflection which prevailed prior to writing are destroyed. In other words, the reflectance of the structure increases as the deformation within the dielectric layer is amplified. In the case of a helium-neon laser ($\lambda_o = 0.63$ μm), the reflectance of the structure is of maximum value and in the vicinity of 70–80% when the deformation Δb of the ductile layer is in the vicinity of 100 nm.

Suitable expandable films include the plasticized films having a base of nitrocellulose as described in the above-cited French patent Application No. 80 01 425 have a thermal expansion which endows them with a deformation of this order of magnitude after writing. Any change in the proportion of plasticizer involving either an increase or a decrease makes it possible to destroy the conditions of antireflection irrespective of the writing wavelength at which tuning of the optical cavity has been effected. So far as thermodeformable films are concerned, preference will be given to the polymers described in French patent Application No. 80 01 423 and more particularly to the high-hardness polymers such as PVC, poly-α-methylstyrene. The thickness chosen for the metal film layer 1 will be sufficient to ensure that the development of the gas bubble 8 under the impact of the laser beam 6 gives rise to the desired deformation or in other words a deformation leading to destruction of the conditions of antireflection under the impact of the laser beam.

According to a second aspect of the present invention, deformation of the polymer may be assisted either in the case of an expandable or thermodegradable polymer by adding a dye or pigment thereto through all or part of the thickness of the layer in order to ensure that part of the radiation is absorbed by the polymer itself, thus having the effect of increasing its temperature over a larger volume and therefore resulting in a deformation within a greater thickness of polymer. In this case, the thicknesses of the polymer 3 and the ductile metal layer 1 are not exactly those which prevail prior to incorporation of the dye or pigment but the procedure remains the same. Suitable dyes or pigments for this purpose are those which have a high absorption capacity for the writing light such as, for example, fluorescein, Sudan black, and so on, if the writing laser employed is a He-Ne laser. Furthermore, the vitreous chalcogenides and in particular, the selenium-base and arsenic-base glasses not only have a good lifetime but also exhibit advantageous properties of deformability such as a low-temperature softening point or a high vapor pressure. Furthermore, the chalcogenide glasses have a low absorption capacity in the red or infrared region and may therefore be employed within the scope of this invention.

No matter which embodiment of the present invention is adopted, the absorbed power drops by a value in the vicinity of 60% of its initial value at the end of deformation of the dielectric layer or in other words prior to the end of the pulse time-duration, provided that the conditions of antireflection are satisfied prior to writing and that these antireflection conditions are destroyed during the writing operation.

Figure 2:
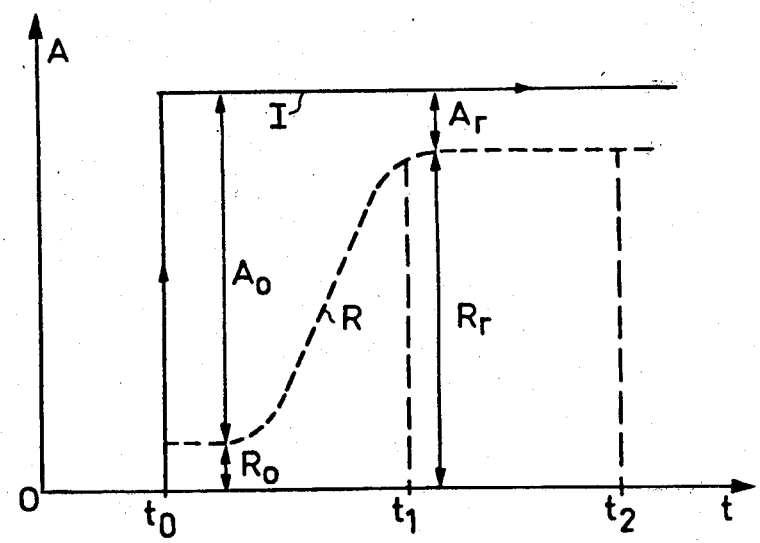
FIGS. 2 to 4 are explanatory diagrams of the mode of writing of the medium shown in FIG. 1.

The self-regulating writing process can be more readily understood by means of the diagram of FIG. 2. This diagram expresses as a function of time the progressive variation in optical power A and the distribution of said power.

At the instant $t_0$, there is applied to the information medium an incident optical power which is represented by the full-line step I. At this stage, a small fraction $R_o$ of this power is reflected and the greater part $A_o$ performs a contributory function via the ductile layer 1 in heating the thermodeforming sub-layer 3. The deformation produced during the writing operation produces a variation in power distribution in accordance with the dashed-line curve R. At the instant $t_1$, the self-regulating effect is saturated since the reflected power attains the value $R_r$ whilst the absorbed power has dropped to the value $A_r$. The deformation no longer varies at the instants $t_2$ since the residual heating is of low value. If the power of the incident beam varies, the saturation effect is produced more or less rigidly but increases the range of exposure of the information medium in all cases.

In regard to writing of an information medium in the form of a disk, if the etching power chosen at the center of the disk is $P_{int}[1 + \Delta P_r/P_{int} + \Delta P_d/P_{int}]$ where $P_{int}$ is the nominal power required to carry out optimum writing inside the disk, $\Delta P_r$ is the power increment required to carry out optimum writing outside the disk and $\Delta P_d$ is the maximum power attenuation produced by any defect encountered by the writing beam prior to its impact on the sensitive layer, the deformation will take place during a time interval $\tau_1$ which is shorter than or equal to the time-duration $\tau_2$ of the light pulse and will have a well-defined and reproducible value at the end of the interval $\tau_1$, not only along a given radius but also irrespective of the radius, even if a local defect has reduced the usable power by the value $\Delta P_d$.

In this exemplified embodiment of the invention, a reflecting aluminum film layer 2 having a thickness of 100 nm is deposited by vacuum evaporation on a transparent substrate 4 of methyl polymethacrylate (PMMA) having a thickness of 1.5 mm. A film layer 3 of poly-Δ-methyl styrene having a thickness of 320 nm is then deposited from a 40 g/l solution in butyl acetate centrifuged on the substrate at a velocity of 350 revolutions per minute. Finally, a film layer 1 having a thickness of 10 nm and consisting of an alloy having a mass composition $Cr_{45} Au_{55}$ is again deposited by vacuum evaporation at a rate of 0.2 $nm.s^{-1}$. The reflectance of the structure in the case of a beam having a wavelength of 0.63 $\mu m$ and propagating in air is in the vicinity of 40%. A static writing experiment has shown that the sensitivity of the structure is greater by 30% than the sensitivity which characterizes the deformable monolayer, that is, the structure without a reflecting layer of aluminum. Furthermore, after writing, the reflectance measured at the center of the writing spot has been found equal to 80%. A dynamic writing experiment has been carried out at 1500 revolutions per minute by means of a He-Ne laser having an output power of 15 mw and by means of an objective having a numerical aperture of 0.33. The optimum etching power in respect of a modulation frequency of 5 MHz and a modulation index of 50% has been found equal to 5.5 mW on the radius R=100 mm of the disk and 6.6 mW on the radius R=150 mm, which represents an increase of 20%. It has also been observed that dust particles which were present on the layer produced a drop in available power which was less than or equal to 10%. The use of an incident power equal to 5.5 (1+0.2+0.1)=7.15 mW resulted in etching which exhibited optimum contrast at the time of reading and was perfectly reproducible from one etched spot to the next irrespective of the radius, that is, both on the radius R=100 mm and on the radius R=150 mm.

Figure 5:
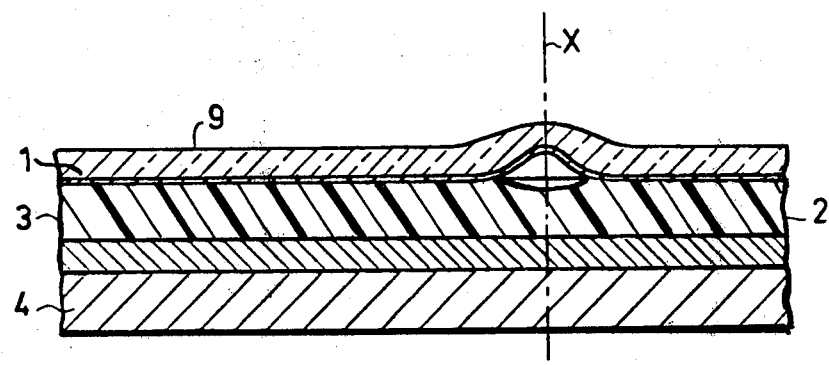
FIG. 5 is a sectional view of a second alternative embodiment of the information medium in accordance with the invention.

FIG. 5 shows in cross-section an information recording medium in which the ductile film layer 1 is covered with a protective layer 9 of transparent polymeric material, the function of which is to guard against external aggressive agents, whether of a chemical or mechanical nature. The material of the layer 9 must have a low degree of hardness in order to prevent any interference with deformation of the ductile metal film 1 under the impact of the laser beam. By way of non-limitative example, said protective deposit 9 can be constituted by a thermosetting silicone of the type manufactured by the Dow-Corning corporation and designated as "Sylgard 184". This material can be deposited in a uniform layer of substantial thickness by centrifugation, for example. A further advantage of the material is that it has relatively low adherence on the structure to be protected. If so required, it may thus be readily removed, for example if a complete copy of the information contained in the sensitive layer is necessary.

Another distinctive feature of the protective coating 9 lies in the fact that it does not constitute a thermodeforming layer having the same characteristics as the layer 3. While bearing this in mind, other polymers may also be employed such as, for example, the highly plasticized films mentioned in French patent Application No. 80 01 425, as well as polystyrene.

Figure 6:
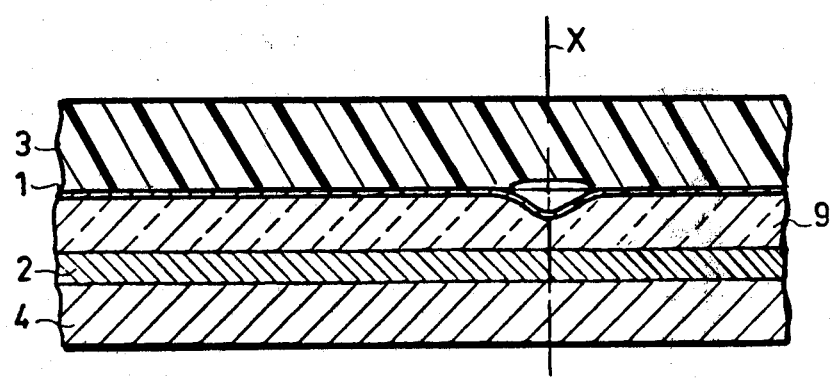
FIG. 6 is a sectional view of a third alternative embodiment of the information medium in accordance with the invention.

In FIG. 6, the layers 3 and 9 are reversed, thus changing the direction of deformation of the ductile layer 1. The protective function is performed by the thermodeforming layer 3 and the sole function of the layer 9 is to fix the thickness of the optical cavity delimited by the layers 1 and 2. In consequence, it is apparent that the nature of the polymer employed for deformation of the ductile metal layer and the nature of the material employed for protecting this layer are wholly interchangeable. The formation of a positive or negative surface relief in the ductile metal layer in fact results in an identical signal at the time of reading. This property is advantageous insofar as it may lead if necessary to the possibility of depositing the reflecting layer, the dielectric layer with conditions of anti-reflection, and the absorbent layer by means of the same technology (crucible evaporation, cathodic sputtering, and so on), which may not be the case if the heat-expandable or thermodeformable layer is to be sandwiched between the reflecting metal film and the ductile metal film.

The present invention is not limited to the case in which the substrate 4 is a reflecting film or to the case in which this latter is covered with a totally reflecting metal film layer 2. One advantageous alternative embodiment illustrated in FIG. 7 relates to the case in which the structure is formed by successively depositing on a substrate 10 the thermodeforming polymeric layer 3, the ductile metal layer 1 and then a dielectric layer 9 having a low degree of hardness and adapted to obtain anti-reflection conditions, and finally the highly reflecting film layer 2. In this case, writing is performed through the transparent substrate 10 but the behavior of the structure is similar to that described earlier. Only the thickness of the dielectric layer 9 and of the ductile metal layer 1 must be adapted so as to take into account the generally lower reflection of the ductile metal layer in the presence of the layer 3. It should further be noted that, in this case also, the thermodeforming polymeric layer 3 and the low-hardness dielectric layer 9 may be reversed, which has the effect of changing the direction of deformation within the ductile metal layer but does not affect the usable signal. This alternative embodiment is shown in cross-section in FIG. 8.

Figure 7:
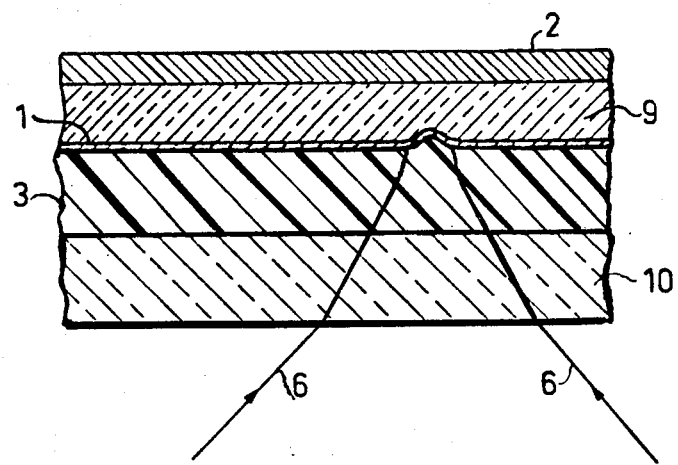
FIG. 7 is a sectional view of a fourth alternative embodiment of the information medium in accordance with the invention.
Figure 8:
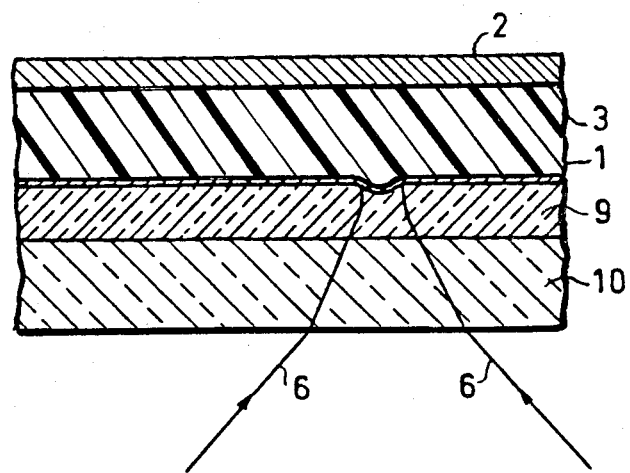
FIG. 8 is a sectional view of a fifth alternative embodiment of the information medium in accordance with the invention.

Instead of making use of a solid protective layer, the etching may be protected by means of a cover. This protective cover will be transparent to the reading radiation in the case of FIG. 1 but may also be opaque if the substrate 4 is transparent as shown in FIGS. 7 and 8.

It has been considered thus far that the self-regulating effect of thermo-optical writing is obtained by means of a single ductile metal film layer 1 placed opposite to a reflecting film layer 2.

Without departing from the scope of the present invention, it is also possible to interpose a second ductile metal layer which is partially permeable to the writing radiation.

FIG. 9 shows a structure which is related to that of FIG. 6 but is provided above the thermodeforming layer 3 with a second ductile metal layer 12 which is partially permeable to the writing radiation. If so required, this layer 12 may be protected by a transparent coating 11 having a low degree of hardness. A first optical cavity is delimited by the layer 2 and the layer 1. A second optical cavity is delimited by the ductile layers 1 and 12. When the information recording medium is in the blank state, said two optical cavities cooperate in order to reduce the reflection factor to the wavelength of the writing light radiation. The action of the thermodeforming layer 3 consists in simultaneously deforming the ductile layers 1 and 12 while at the same time providing self-regulation by detuning of the two optical cavities.

In FIG. 10 the order of the deposits has been reversed in order to ensure that the cavity defined by the two ductile layers 1 and 12 is located between two thermodeforming layers 3 and 13. The direction of deformations is reversed since the layer 9 collapses under the thrust exerted by the two thermodeforming layrs 3 and 13.

In the case of FIGS. 9 and 10, one of the ductile layers 1 or 12 can be formed of a metal which permits writing by ablation. The thicknesses of the dielectric and metallic layers are chosen not only in order to ensure antireflection but also in order to ensure that approximately one-half of the absorbed power is absorbed in each metal layer 1 and 12. This results in a certain number of advantages. In the first place, if the outer metal layer is ductile, this permits the possibility of total duplication as described in French patent Application No. 80 01 423 cited earlier. Furthermore, the archival storage capacity of the structure is multiplied by two. Finally, writing defects which could result from marked degradation on each side of the metal layers have a lower effect on the reading operation insofar as the information written in each of the ductile or ablation metal layers is read simultaneously. The final result is a lower error rate.

The structures which have just been described are attended by a disadvantage in that they consist of up to six layers. However, said structures may be simplified whenever the highly reflecting film layer is dispensed with and in the event of achievement of antireflection conditions by adapting the thickness of the dielectric layer between the deformable or ablation metal layers. A further advantage of this structure lies in the fact that it can be written indifferently on the front face or in other words through the protective covering layer or through the substrate. However, while writing is in progress, deformation of the polymer which constitutes the dielectric layer does not permit considerable modification of reflectance of the structure in the event that the reflectance of each metal storage layer is of relatively low value ($\simeq 40\%$). The result thereby achieved in this case is that the power self-regulating effect is lower than in the structures described earlier.

In FIG. 11, the structure is related to that of FIG. 9 but a transparent substrate 10 has been substituted for the assembly 2-4. In FIG. 12, the structure is related to that of FIG. 10 but the assembly 2-4 is replaced by a transparent substrate 10.

The present invention is of considerable advantage in systems for recording and restitution of data which utilize the same wavelength for both recording and reading, which is the most common situation. It is necessary in this case, however, to ensure that the antireflection conditions of the structure prior to writing are not wholly satisfied (that is, the reflection of the read beam is in the vicinity of 10-20%) in order that it may thus be possible to follow the surface of the disk by means of the focusing devices commonly employed with these data recording and restitution systems. As a result, the modification of reflectance of the system during destruction of the quasi-antireflection conditions by writing of data is equal at a maximum to 50-70%. It is also possible to employ a read beam having optical characteristics which are different from the write beam and tuning of the optical cavity is chosen so as to ensure optimum antireflection in respect of the writing radiation wavelength. As a general rule, this results both in high reflectance in respect of the reading radiation wavelength. Thus, during the writing operation, not only is it possible for the reflectance to attain 70-80% in this case (which means that the power self-regulating effect in real time is substantial) but, in addition, there is a modification of reflection of the read beam (amplitude effect) which is superimposed on the diffraction of said beam on the writing relief. This results in enhanced contrast at the time of reading or in other words in lower quantum noise in the case of the detectors employed. Maximum effect is achieved if the thickness b of the dielectric contained in the optical cavity is:

$$b = (2k+1)\lambda\text{writing}/4n = N\lambda\text{reading}/2n$$

where k and N are whole numbers.

If $\lambda$ writing = 0.83 $\mu$m and $\lambda$ reading = 0.63 $\mu$m and n = 1.5, the maximum effect will be obtained when R = 1 and N = 4, namely in respect of a thickness b of 400 nm.

What is claimed is:

1. A thermo-optical method for writing information on a medium comprising a ductile metal film layer associated with a contiguous film layer of thermodeforming organic substance, in which the writing operation utilizes a beam of incident light radiation having a predetermined level of said ductile metal film layer, wherein said ductile metal layer is partially permeable to said radiation and the method accordingly consists in providing the information medium with a reflecting metal film layer which forms with the ductile metal layer an optical cavity having parallel faces; the optical length of said optical cavity being adjusted for ensuring antireflection for said wavelength of said incident light radiation; the local thermodeforming of the wall of said optical cavity during exposure to said incident radiation causing detuning of said optical cavity for self regulating said exposure.

2. A method according to claim 1, wherein said layer of thermodeforming organic substance is located within said optical cavity.

3. A method according to claim 1, wherein the thermodeforming layer is formed of heat-expandable material.

4. A method according to claim 1, wherein the thermodeforming layer is formed of thermodegradable material.

5. A thermo-optical method for writing information on a medium comprising a ductile metal film layer associated with a contiguous film layer of thermodeforming organic substance, and being a ductile layer partially permeable to writing radiation in which the writing operation utilizes a beam of light radiation having a predetermined wavelength and a point of convergence which is located at the level of said ductile metal film layer, wherein said ductile metal layer is partially permeable to said radiation and the method accordingly consists in providing the information medium with a reflecting metal film layer which forms which the ductile metal layer an optical cavity located between two layers of thermodeforming organic substance, and having parallel faces and in tuning said optical cavity in such a manner as to ensure that the reflection of said light radiation from said ductile metal layer increases with the local deformation induced within said cavity under the thermodeforming action of that zone of said layer of organic substance which is exposed to said radiation.

6. A method according to claim 5, wherein provision is also made for a second optical cavity coupled with the optical cavity aforesaid, said second optical cavity being delimited by one of the ductile metal layers and by a reflecting film layer which does not transmit the writing radiation.

7. An information medium to be written by exposure to a beam of incident light radiation of predetermined wavelength, said medium being constituted by a ductile metal film layer associated with a contiguous layer of thermodeforming organic substance, wherein said ductile metal layer is partially permeable to said radiation, an optical cavity having parallel faces being formed between a reflecting metal film layer and said ductile metal layer; the optical length of said cavity being adjusted for insuring antireflection at said wavelength of said incident light radiation; the thermodeforming of said organic substance causing detuning of said optical cavity for self regulating said exposure.

8. A medium according to claim 7, wherein the reflecting metal layer does not transmit said light radiation.

9. A medium according to claim 8, wherein the reflecting metal layer covers the other layers deposited on the substrate, said substrate being permeable to the light radiation.

10. A method according to claim 7, wherein the reflecting metal layer is partially permeable to said light radiation.

11. A medium according to claim 10, wherein one of the metal layers which delimits said optical cavity is a thermodegradable layer which permits writing by thermal ablation.

12. A medium according to claim 7, wherein the thermodeforming substance is located within the optical cavity aforesaid.

13. A medium according to claim 7, wherein the thermodeforming substance is a heat-expandable substance.

14. A medium according to claim 7, wherein the thermodeforming substance is a thermodegradable substance.

15. A medium according to claim 7, wherein the thermodeforming substance partially absorbs said light radiation.

16. A device for reading an information medium according to claim 7, wherein said optical cavity is also tuned so that those zones of the medium which are not written have maximum reflectance at the reading wavelength, the reading wavelength being different from the wavelength which has served to write the information.

17. An information medium to be written by means of a beam of light radiation of predetermined wavelength, said medium being constituted by a ductile metal film layer associated with a contiguous layer of thermodeforming organic substance, wherein said ductile metal layer is partially permeable to said radiation, an optical cavity having parallel faces being formed between a reflecting metal film layer partially permeable to said light radiation and said ductile metal layer, said cavity being tuned so that the reflection factor of said medium at said wavelength increases with the deformation induced by said beam of light radiation, said optical cavity being coupled with a second optical cavity having parallel faces and delimited by said reflecting metal layer and by another reflecting metal layer which does not transmit said light radiation.

18. An information medium to be written by means of a beam of light radiation of predetermined wavelength, said medium being constituted by a ductile metal film layer associated with a contiguous layer of thermodeforming organic substance, wherein said ductile metal layer is partially permeable to said radiation, an optical cavity having parallel faces being formed between a reflecting metal film layer and said ductile metal layer, said cavity being tuned so that the reflection factor of said medium at said wavelength increases with the deformation induced by said beam of light radiation, and the thermodeforming substance being located on each side of said optical cavity, said cavity being provided with a transparent layer which is capable of yielding under pressure exerted by said thermodeforming substance.

19. An information medium to be written by means of a beam of light radiation of predetermined wavelength, said medium being constituted by a ductile metal film layer associated with a contiguous layer of thermodeforming organic substance, wherein said ductile layer is partially permeable to said radiation, an optical cavity having parallel faces both accessible to said light radiation, and being formed between a reflecting metal film layer partially permeable to said light radiation and said ductile metal layer, said cavity being tuned so that the reflection factor of said medium at said wavelength increases with the deformation induced by said beam of light radiation.

* * * * *